Feb. 1, 1927.
B. KNIGHT
1,616,377
GOLF PUTTER GUIDE
Filed May 20, 1926
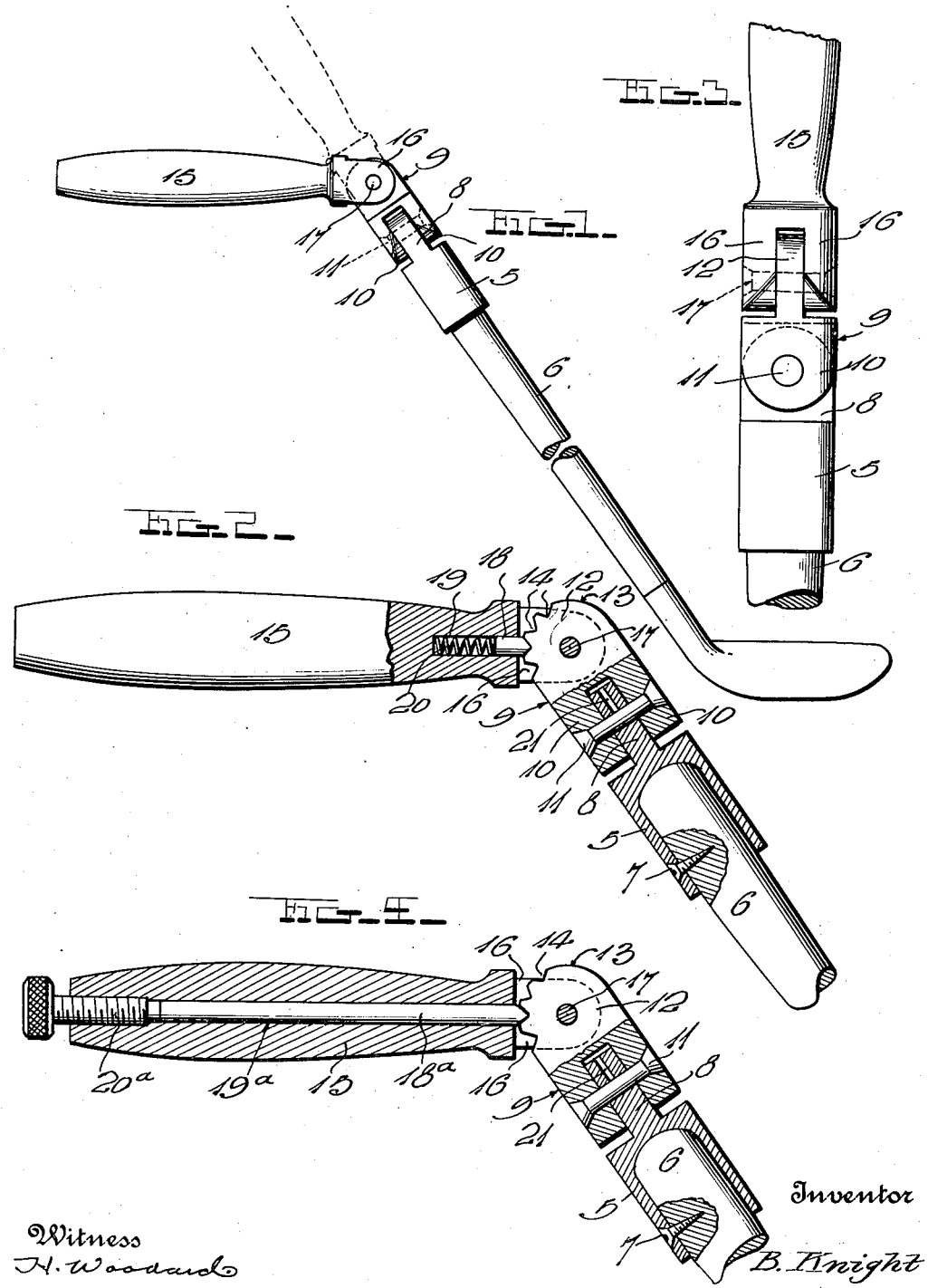

Patented Feb. 1, 1927.

1,616,377

UNITED STATES PATENT OFFICE.

BENJAMIN KNIGHT, OF WINONA, MINNESOTA.

GOLF-PUTTER GUIDE.

Application filed May 20, 1926. Serial No. 110,467.

The invention relates to golf player's equipment and has reference more particularly to a device for attachment to the staff of a putter, for the purpose of guiding the movement of the latter while it is being used, insuring that it shall only move in an accurate manner.

The object of the invention is to provide a device of the character set forth which may readily be adjusted to suit the fancy of the individual player and will insure that the putter shall only be operated in the intended manner, without any danger of swinging its face accidentally into undesired angular relation with the line on which the ball is to be driven.

With the foregoing in view, the invention resides in the novel subject matter hereinafter described and claimed, the description being supplemented by the accompanying drawing.

Figure 1 is a side elevation showing the application of the invention to a putter.

Figure 2 is an enlarged vertical section partly in elevation.

Figure 3 is an elevation of the device looking in a different direction from Fig. 1.

Figure 4 is a sectional view showing a modified form of construction.

In the drawing above briefly described, the numeral 5 designates a socket adapted to receive the upper end of a putter staff 6, and any suitable means such as a screw 7 passing through an opening in said socket, may be used to relatively secure the socket and staff. The upper end of this socket is provided with an upwardly projecting, flat-sided lug 8. A coupling member 9 of elongated form, is provided at one end with a pair of laterally spaced lugs 10 which straddle the lug 8 and are pivoted to it by a rivet or other suitable pivot 11, and the opposite end of said coupling member is provided with an upwardly projecting lug 12 of flat-sided form. This lug is provided with an arcuate edge 13 having spaced notches 14, for a purpose to appear.

A handle 15 is provided, said handle having a pair of forwardly projecting lugs 16 which straddle the lug 12 and are connected with the latter by a suitable pivot 17, at right angles to the pivot 11, and slidable within said handle, is a detent for engagement with any of the notches 14, to hold the handle and the coupling member 9 in any desired angular relation with each other. In the form of construction detailed in Fig. 2, the detent is in the form of a short pin 18 slidable in a bore 19 in the handle 15 and urged outwardly toward the lug 12, by a coiled compression spring 20 which is housed within said bore. This construction permits relative adjustment of the handle 15 and the coupling member 9, merely by grasping the handle with one hand and turning the coupling member with respect thereto, during which operation, the detent 18 will snap from one notch into the next, until the proper angular relation of handle and staff has been attained.

In the form of construction shown in Fig. 4, the detent is in the form of a relatively long pin 18$^a$ slidable in a bore 19$^a$ in the handle 15, and instead of making use of a spring to project this pin and permit retraction thereof, a screw 20$^a$ is threaded into the rear end of the aforesaid bore. This screw is of course loosened when the handle 15 is to be adjusted with respect to the coupling member 9 and the staff 6, and when proper setting has been attained, tightening of the screw 20$^a$ will project the pin 18$^a$ into one of the notches 14, so that the parts will be held in relatively adjusted position.

The handle 15, in using the device, may be held in one hand or against any desired portion of the player's body, and with the other hand, he then swings the staff 6 about the pivot 11. By so doing, he is insured that he shall strike the ball in the desired manner to attain the end which he seeks.

To insure that the staff 6 shall easily swing about the pivot 11, I preferably provide the lug 12 with an oil hole 21 which is exposed to receive oil when the socket 5 is swung laterally with respect to the coupling member 9.

The device, it will be observed, is simple and inexpensive, yet will be efficient and in every way desirable. Excellent results are obtainable from the details disclosed and they are therefore preferably followed, but within the scope of the invention as claimed, variations may be made.

I claim:—

1. A putter guide comprising a coupling member and means for pivotally connecting it with the staff of a putter, a handle pivotally connected with said coupling member on an axis transverse to the first named pivotal connection, and means for holding said coupling member and handle in any desired angular relation.

2. A structure as specified in claim 1; said holding means comprising a movable detent carried by the handle and spaced notches in a portion of said coupling member; any of said notches being engageable with said detent.

3. A putter guide comprising a socket to receive the upper end of a putter staff, the upper end of said socket having a projecting lug, a coupling member having a pair of lugs at its lower end straddling and pivoted to the lug of said socket, the upper end of said coupling member being provided with an upwardly projecting lug in a plane at right angles to the inner faces of said pair of lugs, the last named lug having a curved edge provided with spaced notches, a handle having a pair of forwardly projecting lugs straddling said last named lug and pivoted thereto on an axis at right angles to the first named pivot, and a projectible and retractible detent slidably mounted in said handle for engagement with any of said notches to hold said handle and said coupling member in desired angular relation with each other.

In testimony whereof I have hereunto affixed my signature.

BENJAMIN KNIGHT.